United States Patent [19]

Steinstrasser et al.

[11] Patent Number: 4,849,057
[45] Date of Patent: Jul. 18, 1989

[54] APPARATUS FOR THE PYROLYSIS OF WASTE MATERIAL

[75] Inventors: Frank Steinstrasser, Herne; Gerhard Rossol, Geretsried, both of Fed. Rep. of Germany

[73] Assignee: BBC Brown Boveri Aktiengesellschaft, Mannheim, Fed. Rep. of Germany

[21] Appl. No.: 213,526

[22] Filed: Jun. 30, 1988

[30] Foreign Application Priority Data

Jun. 30, 1987 [DE] Fed. Rep. of Germany ....... 3721475

[51] Int. Cl.$^4$ .................. B01D 5/00; C10K 1/04; F28B 5/00
[52] U.S. Cl. .................................. 202/96; 55/241; 196/140; 261/17; 261/112.1; 261/116; 261/DIG. 9; 261/DIG. 54; 422/207
[58] Field of Search ............ 202/96; 196/140; 422/207; 261/17, 112.1, 116, DIG. 9, DIG. 54; 55/48, 89, 241; 48/87, 111, 128; 110/215

[56] References Cited

U.S. PATENT DOCUMENTS

| | | | |
|---|---|---|---|
| 2,560,645 | 7/1951 | Hays | 196/140 |
| 3,015,619 | 1/1962 | Wimmer et al. | 196/140 |
| 3,322,647 | 5/1967 | Calaway | 196/140 |
| 3,353,803 | 11/1967 | Wechselblatt et al. | 261/116 |
| 3,593,968 | 7/1971 | Geddes | 261/112.1 |
| 3,871,305 | 3/1975 | Watanabe et al. | 261/112.1 |
| 4,591,366 | 5/1986 | Wohner et al. | 55/89 |

Primary Examiner—Joye Woodard

[57] ABSTRACT

A plant for the pyrolysis of waste material containing hydrocarbons has a cooling stage. In this cooling stage, the hot pyrolysis gas coming from the pyrolysis reactor is cooled by direct heat exchange with low-boiling pyrolysis oil which is obtained in a further cooling stage by condensation of pyrolysis gas. For this purpose, a multiplicity of spray nozzles disposed in the form of a ring are provided in the heat exchange channel of the cooling stage, with a spray direction of the nozzles pointing substantially downwards. The end of the hot gas line which connects the cooling stage to the pyrolysis reactor is located above the spray nozzles. At the same time, feed lines for a protective, buffer or blanketing gas end in this region. In addition, an annular channel encloses the heat exchange channel and has orifices in the inner wall surface of the heat exchange channel, so that pyrolysis oil fed through the line cools and wets the wall of the heat exchange channel. This structure avoids the deposition of tar constituents from the pyrolysis gas on the wall of the heat exchange channel, while the hot pyrolysis gas is well cooled.

9 Claims, 1 Drawing Sheet

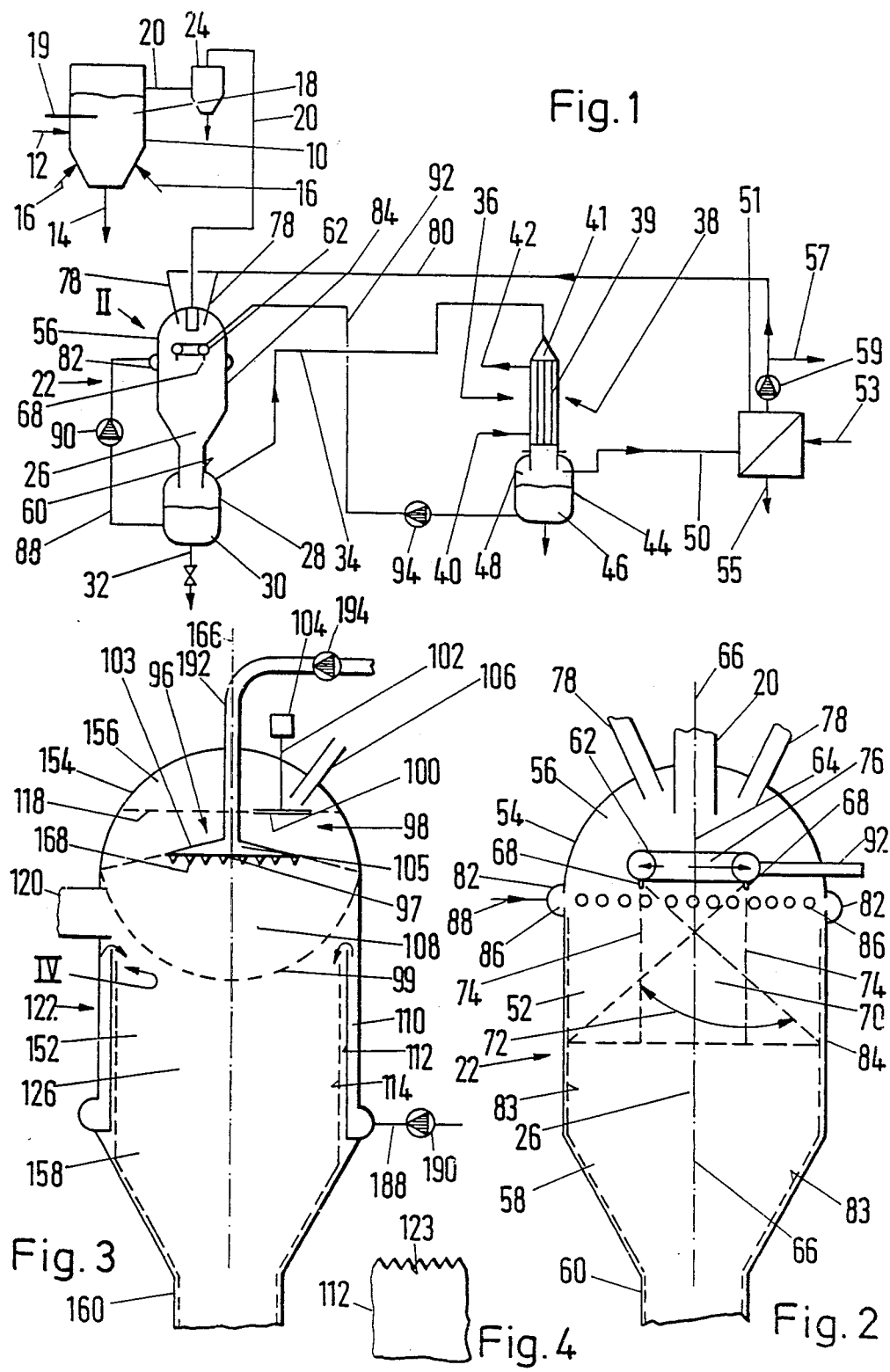

APPARATUS FOR THE PYROLYSIS OF WASTE MATERIAL

BACKGROUND OF THE INVENTION

1. Field of the Invention

The invention relates to a plant for the pyrolysis of waste material containing hydrocarbons, especially waste material containing plastic and/or rubber wastes, including a pyrolysis reactor, and at least one cooling stage for hot pyrolysis gas produced in the pyrolysis reactor, at least the cooling stage immediately downstream of the pyrolysis reactor having a cooler with a downwardly-extending heat exchange channel for direct heat exchange between the hot pyrolysis gas and pyrolysis oil produced by condensation of pyrolysis gas.

2. Description of the Prior Art

In order to cool and partially condense hot pyrolysis gas in a pyrolysis plant, it is known from German Published, Prosecuted Application DE-AS 29 28 676 to directly contact the pyrolysis gas with sprayed-in pyrolysis oil in a cooling stage with a vertically extending heat exchange channel. In such a case, the pyrolysis oil which is sprayed is obtained by direct cooling in the cooling stage. During the cooling step, there is a risk of hot pyrolysis gas coming into contact with the cooler wall of the heat exchange channel, of constituents of the pyrolysis gas condensing, cracking and/or polymerizing in an undesirable manner and of solid or viscous reaction products, especially coke, soot or tars, depositing on the wall. In the prior art cooling stage, the deposition is greatly promoted by the spray directions of the spray nozzles which are horizontally aligned opposite one another and thus allow large regions of the inside wall to be subjected to the hot pyrolysis gas. In addition, there is also a large distance between the spray nozzles and the upper feed point of the hot pyrolysis gas, making further large wall areas available for condensation and/or cracking. Finally, the wall of the heat exchange channel must be formed of a material which withstands the hot pyrolysis gas at a temperature of from 400° to 900° Celsius. This increases the cost of the plant.

SUMMARY OF THE INVENTION

It is accordingly an object of the invention to provide a plant for the pyrolysis of waste material, which overcomes the hereinafore-mentioned disadvantages of the heretofore-known devices of this general type, which has an inexpensive construction, and which avoids undesired fouling and precipitates on the inside wall of the heat exchange channel. Furthermore, the plant should be easily adaptable to differing operating conditions and be able fully to withstand the stresses which occur.

In order to achieve this object, two structurally different embodiments of a cooling stage are proposed.

With the foregoing and other objects in view there is provided, in accordance with the first embodiment of the invention, a plant for the pyrolysis of waste material containing hydrocarbons, especially waste material containing plastic and/or rubber wastes, comprising a pyrolysis reactor, and a cooling stage immediately downstream of the pyrolysis reactor for hot pyrolysis gas produced in the pyrolysis reactor, the cooling stage having a cooler with a downward-extending heat exchange channel for direct heat exchange between pyrolysis gas and pyrolysis oil produced by condensation of pyrolysis gas, the heat exchange channel having a wall with an inner surface, an upper end region and a lower end, a plurality of pyrolysis oil spray nozzles disposed in a ring in the upper end region of the heat exchange channel having a spray direction aligned substantially toward the lower end of the heat exchange channel, a hot gas line leading into the heat exchange channel above the spray nozzles for feeding hot pyrolysis gas, at least one feed line leading into the upper end region above the spray nozzles for protective gas, and at least one overflow channel for pyrolysis oil below the spray nozzles for applying a layer of pyrolysis oil to the inner surface of the wall of the heat exchange channel.

In accordance with another feature of the invention, there is provided another cooling stage downstream of the first-mentioned cooling stage.

Due to the annular configuration of the spray nozzles, the entire cross section of the heat exchange channel is filled with pyrolysis oil sprayed in the form of drops, so that the hot pyrolysis gas is intensively and rapidly cooled during the downward flow in the heat exchange channel and precipitation of tar or solid materials is avoided. Since the space above the spray nozzles is filled by a protective, buffer or blanketing gas, especially in the region close to the wall, the hot pyrolysis gases do not come into contact with the wall of the heat exchange channel. Depositions and precipitations are therefore also avoided in this region. In order to also screen the region below the spray nozzles from undesired depositions and precipitations, pyrolysis oil which is colder than the hot pyrolysis gas is applied through the overflow channel to the inside wall of the heat exchange channel. This pyrolysis oil runs down along the entire periphery of the inside wall and protects the wall from undesired precipitations of tar or other materials. At the same time, intensive cooling of the wall is obtained, so that it is possible to use a material for the wall which does not have a particular heat resistance and is therefore inexpensive, preferably steel.

In accordance with a further feature of the invention, there is provided a toroidal distributor pipe on which the spray nozzles are disposed, the toroidal distributor pipe having a central axis parallel to the vertical or longitudinal axis of the heat exchange channel. Preferably, the center axis and the longitudinal axis coincide. Since this results in the hot pyrolysis gas jet introduced at the top being guided through the interior of the toroidal distributor pipe, particularly good mixing of the hot pyrolysis gas with the sprayed, colder pyrolysis oil takes place.

In accordance with an added feature of the invention, the wall of the heat exchange channel is vertical, and the spray nozzles have spray cones with a spray angle of substantially 45° to 60° aligned downward forming circumferential lines of the spray cones in the vicinity of the vertical wall, as viewed in a vertical central section, each running substantially parallel to and at a distance from the vertical wall. This is done in order to fill the cross section of the heat exchange channel with spray mist, using the smallest possible number of spray nozzles.

In accordance with an additional feature of the invention, the overflow channel encloses the wall of the heat exchange channel, and the inner surface of the wall of the heat exchange channel has a multiplicity of passage orifices formed therein. This is advantageous for applying the pyrolysis oil layer to the inside wall of the heat exchange channel.

The protective, buffer or blanketing gas may be nitrogen, but it is more advisable and less expensive if, in accordance with yet another feature of the invention, the protective gas is substantially formed of cooled pyrolysis gas which has been freed of oil and purified.

With the foregoing and other objects in view, there is also provided, in accordance with a second embodiment of the invention, a plant for the pyrolysis of waste material containing hydrocarbons, especially waste material containing plastic and/or rubber wastes, comprising a pyrolysis reactor, and a cooling stage immediately downstream of the pyrolysis reactor for hot pyrolysis gas produced in the pyrolysis reactor, the cooling stage having a downward-extending heat exchange channel for direct heat exchange between hot pyrolysis gas and pyrolysis oil produced by condensation of pyrolysis gas, the heat exchange channel having a side wall with an inner surface, an upper end region, a lower end, an intermediate region between the upper end region and the lower end and a vertical axis, at least one pyrolysis oil spray nozzle in the upper end region of the heat exchange channel having a downwardly-aligned spray direction and forming a spray cone extending over the entire cross-section of the heat exchange channel, a hot gas line in the side wall of the heat exchange channel feeding the hot pyrolysis gas into the heat exchange channel below the spray nozzle in a flow direction crossing or being perpendicular to the vertical axis of the heat exchange channel so that it is horizontal, a rotary atomizer above the spray nozzle having an atomizer disc crossing or being perpendicular to the vertical axis so that it is horizontal, for atomizing the pyrolysis oil, and a partition enclosing the inner surface of the side wall of the heat exchange channel below the spray nozzle in the intermediate region, the partition having an inner surface and having an outer surface spaced from the side wall defining an annular channel having a lower end for receiving the pyrolysis oil and an open upper end forming an overflow for the pyrolysis oil covering the entirety of the inner surface of the partition with a layer of pyrolysis oil. In accordance with another feature of the invention, there is provided a another cooling stage downstream of the first-mentioned cooling stage.

In this embodiment, a spray nozzle having a spray cone which covers the entire cross section of the heat exchange channel is disposed in the upper end region of the heat exchange channel. In this case the hot pyrolysis gas is fed below the spray nozzle in such a way that the emerging hot pyrolysis gas enters the spray cone from the side and mixes well at that location with the pyrolysis oil that is sprayed in. In order to screen the heat exchange channel above the spray nozzle from the penetration of hot pyrolysis gas and to cool it, a rotary atomizer is provided at that location and pyrolysis oil is applied to the atomizer and atomized in the horizontal direction. The spray region which forms screens the upper region of the heat exchange channel from the penetration of hot pyrolysis gas. The annular channel provided below the spray nozzle effectively cools the partition towards the heat exchange channel and the oil film forming on the partition prevents direct contact of the pyrolysis gas with the partition, so that no tar or coke-like constituents can deposit on the partition.

If the plant has a further cooling stage where low-boiling pyrolysis oil is obtained, in accordance with a further feature of the invention, the other cooling stage includes means for obtaining low-boiling pyrolysis oil, the spray nozzles being supplied with the low-boiling pyrolysis oil. Since the low-boiling pyrolysis oil is at a very low temperature compared with the hot pyrolysis gas, the cooling is very effective.

In accordance with an added feature of the invention, there is provided a separator vessel connected to the lower end of the heat exchange channel for high-boiling pyrolysis oil, the separator vessel having an oil space connected to the annular channel with a pump therebetween. This is done because the pyrolysis oil introduced into the annular channel for cooling must not vaporize at the prevailing temperatures.

Adequate cooling is achieved if, in accordance with an additional feature of the invention, the annular channel has a height substantially equal to between once and twice the clear width of the heat exchange channel.

In accordance with yet another feature of the invention, the partition between the heat exchange channel and the annular channel has an upper end with sawtooth-like vertical projections thereon. This promotes the transfer of the pyrolysis oil and formation of an even oil film on the partition is achieved.

For both embodiments, it is advantageous to close the heat exchange channel with a hemispherical cover, so that the upper end region of the heat exchange channel is hemispherical. This construction facilitates the screening of the upper end region from the hot pyrolysis gas.

Since the pyrolysis oil which is fed for wetting the wall of the heat exchange channel must not be vaporized by the hot pyrolysis gas, it is advisable to connect the heat exchange channel to a separator vessel for high-boiling pyrolysis oil from the cooling stage in order to supply pyrolysis oil. In this case the oil space of the separator vessel is connected to the overflow channel, preferably with the insertion of a pump.

If a further cooling stage is provided downstream of the first-mentioned cooling stage, where low-boiling pyrolysis oil is obtained, it is advantageous to supply the spray nozzles with the low-boiling pyrolysis oil obtained in the further cooling stage. This obviates the need for additional purification measures and cooling devices for the pyrolysis oil, such as are necessary for a plant according the state of the art.

Other features which are considered as characteristic for the invention are set forth in the appended claims.

Although the invention is illustrated and described herein as embodied in a plant for the pyrolysis of waste material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic and schematic circuit diagram showing the structure of a plant with two cooling stages according to the invention;

FIG. 2 is an enlarged, fragmentary, diagrammatic, central vertical-sectional view of a first embodiment of the cooling stage shown in the portion II of FIG. 1;

FIG. 3 is a view similar to FIG. 2 of a second embodiment of the cooling stage; and FIG. 4 is an enlarged, fragmentary view of the portion of FIG. 3 seen in the direction along an arrow IV.

DESCRIPTION OF THE PREFERRED EMBODIMENTS

Referring now to the figures of the drawings in detail and first, particularly, to FIG. 1 thereof, there is seen a pyrolysis plant having an upright pyrolysis reactor 10. The waste material, preferably small pieces of plastic or rubber, is introduced through a line 12 into a fluidized bed 18 and residual material remaining after the pyrolysis is withdrawn from the pyrolysis reactor through a line 14. Since the pyrolysis reactor operates with a fluidized bed, a fluidizing gas is blown through lines 16 into the bottom of the pyrolysis reactor and fluidizes the fluidizing material at the bottom, which is preferably fine-grained sand forming the fluidized bed 18. The heat required for gasification of the waste material is supplied to the fluidized bed through a plurality of gas-fired heating tubes 19. Only one heating tube is shown in FIG. 1.

Hot pyrolysis gas produced in the pyrolysis reactor is withdrawn from the upper region of the pyrolysis reactor 10 through a hot gas line 20 and fed to a cooling stage 22. Inserted into the hot gas line 20 is a cyclone separator 24, in which solid particles carried over by the pyrolysis gas are separated.

In the cooling stage 22, the hot pyrolysis gas, which reaches a temperature of 400° to 1000° C. and preferably 500° to 700° C., is cooled by direct heat exchange with pyrolysis oil to a temperature of about 120° to 180° C. and preferably 140° to 160° C. As a result, part of the pyrolysis gas condenses in a heat exchange channel 26, and a high-boiling pyrolysis oil is formed having a boiling point at atmospheric pressure which is in the temperature range indicated above or higher and is preferably up to 250° C. The high-boiling pyrolysis oil together with the cold pyrolysis gas flows downwards in the vertical heat exchange channel 26 to a first separator vessel 28. In the separator vessel 28, the pyrolysis gas separates from the high-boiling pyrolysis oil which collects in an oil space 30 at the bottom in the upright cylindrical separator vessel 28. The high-boiling pyrolysis oil is withdrawn from the oil space 30 through a line 32 and processed further. Details of the structure and mode of operation of the cooling stage 22 and of the heat exchange channel 26 are explained in more detail in conjunction with FIG. 2.

The cooled pyrolysis gas collecting above the oil space 30 in the separator vessel 28 is withdrawn through a connecting line 34 and fed to the top of a further cooling stage 36. The further cooling stage has an upright tube bundle heat exchanger 38 which operates with indirect heat exchange and is thus a surface heat exchanger. The pyrolysis gas entering heat exchange tubes 39 of the tube bundle heat exchanger 38 at a temperature of 120° to 180° Celsius and preferably 140° to 160° C., is cooled in a downward flow to a temperature of about 30° to 80° and preferably 40° to 60°. A part of the pyrolysis gas thus condenses and a low-boiling pyrolysis oil is formed, having a boiling point at atmospheric pressure which is in the above-mentioned temperature range or higher, up to 120° C. The coolant used is cooling water which is fed through a line 40 to the tube bundle heat exchanger 38 and withdrawn through a line 42.

The vertically extending heat exchange tubes 39 of the tube bundle heat exchanger 38 end at the top in a header 41. The connecting line 34 is connected to the header 41. The cooling tubes 39 are disposed in an upright, cylindrical, closed vessel 43, to which the cooling water is fed at the bottom and from which it is withdrawn from the top, so that the heat exchange with the pyrolysis gas takes place in a counter-current. The bottoms of the heat exchange tubes 39 lead into a second separator vessel 44.

The mixture of low-boiling pyrolysis oil and cooled pyrolysis gas flows downwards in the heat exchange tubes 39 into the upright, second separator vessel 44. In the second separator vessel 44, the low-boiling pyrolysis oil separates from the pyrolysis gas and collects at the bottom in a light oil space 46, whereas the cooled pyrolysis gas collects above the oil in a space 48. The pyrolysis gas is withdrawn from the space 48 through a line 50 and passed to a diagrammatically illustrated heat exchanger 51, where it is cooled by indirect heat exchange to ambient temperature or lower. The coolant used is cooling water, which is fed through the line 53 and withdrawn through a line 55. Excess cold pyrolysis gas from the heat exchanger 51 can be withdrawn through a line 57 and used further, for example as fuel gas. If required, the pyrolysis gas leaving the the heat exchanger 51 may also be passed through a gas scrubber, which is not shown in FIG. 1.

The heat exchange channel 26 of the cooling stage 22 is shown in detail and on a larger scale in the first embodiment shown in FIG. 2. Accordingly, the vertically extending heat exchange channel 26 has a circular-cylindrical region 52 which is closed at the top by an adjoining hemispherical cover 54, so that an upper end region 56 of the heat exchange channel is hemispherical. The circular-cylindrical region 52 is adjoined below by a downwardly tapering, circular-conical region 58. A vertically extending cylindrical channel 60 is centrally connected to the region 58 and leads into the separator vessel 28 seen in FIG. 1. The overall height of the heat exchange channel 26 is 1.5 to 6 times the diameter thereof. The diameter of the channel 60 is 0.2 to 0.5 times the diameter of the region 52.

In the region in which the circular-cylindrical region 52 merges into the hemispherical end region 56, a toroidal distributor pipe 62 is provided in the heat exchange channel 26. The vertical central axis 64 of the distributor pipe coincides with the central vertical axis 66 of the heat exchange channel 26. A multiplicity of spray nozzles 68 is provided in a uniform distribution and in the form of a ring on the distributor pipe 62. The main spray direction of the nozzles points to the lower end of the heat exchange channel. The individual spray nozzles 68 advantageously have a spray angle 72 which is about 45° to 65°. The spray nozzles 68 in this case are aligned towards the vertical axis 66 in such a way that circumferential lines 74 of the spray cones close to the wall run in the region 52 approximately parallel to and at a distance from the wall 84 of the heat exchange channel 26. This can be clearly seen from FIG. 2. As FIG. 2 also shows, the spray angles of the individual spray nozzles overlap to form a common spray cone 70, which covers the entire cross section of the heat exchange channel 26. The mean diameter d of the horizontally disposed toroidal distributor pipe 62 is approximately 0.35 to 0.75 times and preferably 0.45 to 0.6 times the clear diameter of the heat exchange channel 26 in the region 52. The cross section of the distributor pipe 62 is small relative to the cross section of the region 52.

The hot gas line 20 enters the hemispherical end region 56 vertically through the cover 54 and points into a free space 76 which is surrounded by the distributor pipe 62, as is also seen in FIG. 1. The tubular hot gas line 20 in this case is coaxial to the central axis 64 and the vertical axis 66 and protrudes for a length equal to from once to twice the diameter thereof into the end region 56. The vertical distance between the end of the hot gas line 20 and the distributor pipe 62 is approximately 1 to 3 times the clear width of the hot gas line 20.

Several and preferably two feed lines 78 which are uniformly distributed around the hot gas line 20, lead into the hemispherical upper end region 56 of the heat exchange channel. The feed lines protrude for a length of approximately from once to twice the clear diameter thereof into the upper end region 56 and are inclined relative to the vertical axis 66 and point toward the free space 76 which is surrounded by the distributor pipe 62. As can be seen from FIG. 1, the feed lines 78 are connected to a gas line 80 leading to the heat exchanger 51. The gas line 80 is connected to the outlet of the heat exchanger 51, which discharges cold pyrolysis gas. The cold pyrolysis gas does not contain any condensable constituents and is therefore particularly suitable as a blanketing gas.

In the region where the circular-cylindrical region 52 merges into the hemispherical end region 56, an annular overflow channel 82 surrounds the heat exchange channel 26. The overflow channel 82 is located below the distributor pipe 62. Advantageously, the overflow channel 82 has an approximately semicircular cross section and is bounded in one region by the wall 84 of the heat exchange channel near the joint between the wall 84 and the adjoining cover 54. Accordingly, the overflow channel is bounded by a pipe with a semicircular cross section and the wall 84. A multiplicity of preferably circular orifices 86 lead from the overflow channel 82 through the wall 84 into the heat exchange channel 26. In this case the orifices are disposed in a horizontal plane, so that pyrolysis oil which is pumped into the overflow channel 82 passes uniformly through the orifices 86 into the heat exchange channel 26 and flows downwards on the inner surface of the wall 84 to the separator vessel 28. Since a multiplicity of orifices 86 is provided, a layer 83 of pyrolysis oil forms everywhere on the inner surface of the wall 84 and on the wall of the channel 60. In order to supply the overflow channel 82 with pyrolysis oil, a pipe 88 is provided which leads to the oil collection chamber or space 30 of the separator vessel 28 as shown in FIG. 1. A pump 90 is inserted into the pipe 88. The overflow channel 82 has a clear width which is approximately equal to 1/20 to 1/40 of the clear width of the region 52. The outlet velocity of the pyrolysis oil from the orifices 86 must be so low that no oil jet is formed but instead, the pyrolysis oil flows downward only on the inner surface of the wall 84 in the heat exchange channel.

The distributor pipe 62 is connected through a line 92 with an inserted pump 94 to the light oil space 46 of the second separator vessel 44, as seen in FIG. 1.

When the plant is in operation, the waste material fed through the line 12 is heated in the pyrolysis reactor 10 by the heating tubes 19 to between 400° and 1000° C. and degassed in the absence of air. The hot pyrolysis gas is passed to the cyclone separator 24, where dust particles and fly ash are separated from the pyrolysis gas. The pyrolysis gas then flows through the hot gas line 20 to the cooling stage 22 and enters the upper end region 56 of the heat exchange channel.

At the same time, the pump 94 is running, so that low-boiling pyrolysis oil already present in the light oil space 46 is delivered from the light oil space 46 into the distributor pipe 62 and emerges as a fine mist from the spray nozzles 68, forming the spray cone 70. The hot pyrolysis gas emerging from the hot gas line 20 flows downwards in the heat exchange channel 26, first through the free space 76 and then through the spray cone 70. Since the low-boiling pyrolysis oil is at a temperature of about 30° to 60° C., a part of this low-boiling pyrolysis oil is vaporized while cooling the hot pyrolysis gas, so that direct cooling of the hot pyrolysis gas to about 120° to 180° C. takes place. During cooling, a part of the hot pyrolysis gas condenses to produce high-boiling pyrolysis oil, and the mixture of cooled pyrolysis gas and high-boiling pyrolysis oil flows downwards and separates in the separator vessel 28. The high-boiling pyrolysis oil collects in the oil space 30 and the cooled pyrolysis gas is disposed above the oil space 30 and is passed through the connecting line 34 to the further cooling stage 36. In the further cooling stage 36, the pyrolysis gas flows downwards in the tube bundle heat exchanger 38 and is cooled further by cooling water, which is fed and withdrawn through the lines 40 and 42 respectively, so that a pyrolysis gas at a temperature of 30° to 60° C. is formed and collects in the space 48 of the second separator vessel 44. The low-boiling pyrolysis oil formed during cooling also flows downwards and collects in the light oil space 46. From there, the light-boiling pyrolysis oil is fed at a temperature of 30° to 60° C. to the distributor pipe 62 and therefore to the spray nozzles 68, as already explained. From the space 48, the pyrolysis gas flows to the heat exchanger 51, where it is cooled further and any condensable constituents which might still be present precipitate. The cold pyrolysis gas then flows to the line 57 and to the gas line 80. Downstream of the heat exchanger 51, a compressor 59 is inserted into the gas line 80 for delivering the pyrolysis gas. The cold pyrolysis gas from the heat exchanger 51 flows through the gas line 80 to the feed lines 78, from which it enters the upper end region 56 of the heat exchange channel 26. This cold pyrolysis gas fills the hemispherical upper end region 56 as a protective, buffer or blanketing gas, cools the cover 54 and prevents hot pyrolysis gas from coming into contact with the colder cover 54. Precipitations of tar constituents, soot or coke and the deposition thereof on the cover 54 are thus avoided.

In order to also protect the wall 84 of the remaining heat exchange channel 26 from precipitations of tar constituents, soot, coke or the like on the inside, high-boiling pyrolysis oil is fed from the oil space 30 through the pipe 88 to the overflow channel 82, as shown in FIG. 1. From there, the oil passes into the heat exchange channel 26, runs downwards on the inside of the wall 84 of the heat exchange channel 26 and forms an uninterrupted layer 83. As a result, tar depositions on the wall are avoided and cooling of this wall 84 is achieved at the same time. The wall 84 therefore does not have to meet stringent heat resistant requirements, and an inexpensive steel can thus be used.

FIG. 3 shows the second embodiment of the cooling stage in detail. Individual components of the embodiment according to FIG. 2 which recur in FIG. 3, are provided with reference symbols to which 100 has been added to those of FIG. 2. According to FIG. 3, the vertically extending heat exchange channel 126 has a circular-cylindrical intermediate region 152 which is adjoined below by a tapering circular-conical region 158, which is connected to the separator vessel 28 by the channel 160 in the same way as in FIGS. 1 and 2. The region 152 is closed by a hemispherical cover 154, so that the upper end region 156 of the heat exchange channel is likewise hemispherical. In the region in which the circular-cylindrical region 152 merges into the upper end region 156, a flat distributor head 96 is provided in the heat exchange channel and disposed in a horizontal plane. The distributor head 96 has approximately the shape of a flat, circular hollow body, the diameter of which is approximately 0.3 to 0.7 times and preferably 0.4 to 0.6 times, the clear diameter of the region 152. A multiplicity of spray nozzles 168 with a downward spray direction are uniformly distributed on the circular lower surface 97 of the distributor head 96. The spray nozzles 168 are disposed in such a way that during operation, a dense spray mist is formed which completely fills the cross section of the heat exchange channel 126 zonally. The spray mist is indicated by a broken line 99.

The distributor head 96 which is coaxial with the vertical axis 166 of the heat exchange channel, is connected by a vertically and preferably centrally extending line 192 to the light oil space 46 of the further cooling stage 36, with the insertion of a pump 194, as seen in FIGS. 1 and 3. Since the upper surface 103 of the distributor head 96 has a conical shape, the line 192 is connected in the vicinity of the apex 105 of the cone.

A rotary atomizer 98 is provided in the upper end region 156 between the distributor head 96 and the cover 154. The atomizer has a circular, horizontally extending flat atomizer disc 100, which is set into rapid rotation of about 8000 to 12000 rpm by a motor 104 located in the external space, through a vertically extending shaft. A pipe 106, which is connected to the light oil space 46 of the further cooling stage 36 shown in FIG. 1 with the insertion of a non-illustrated pump, ends above the atomizer disc 100. The pipe 106 does not touch the atomizer disc 100.

The hot gas line 120 leading to the cyclone separator 24 leads laterally into a spray cone 108 which is formed by the spray nozzles 168 and is bounded by the broken line 99. The end of the hot gas line 120 is disposed in a horizontal direction in such a way that the emerging hot pyrolysis gas must enter the spray cone 108 horizontally. Advantageously, the hot gas line 120 is introduced into the heat exchange channel 126 in the region in which the circular-cylindrical region 152 merges into the upper end region 156.

In the circular-cylindrical region 152, the heat exchange channel 126 is surrounded by an annular channel 110 which is closed at the bottom and extends upward approximately up to the hot gas line 120 and downward approximately to the region 158. The channel width of the annular channel 110 is approximately 2 to 8 cm and preferably 3 to 5 cm. The upper end of the annular channel is open, so that pyrolysis oil fed from the annular channel 110 can pass into the heat exchange channel 126 and form a downward-flowing, uninterrupted layer 114 on the inside of a partition 112. The lower region of the annular channel 110 is connected by a line 188 with an inserted pump 190 to the oil space 30 of the cooling stage 22. According to an alternative, non-illustrated embodiment, the line 188 may be connected to the light oil space 46 of the further cooling stage 36.

During operation, low-boiling pyrolysis oil is fed from the light oil space 46 by means of the pump 194 and the pipe 192 to the distributor head 96, so that it flows to the nozzles 168. The nozzles atomize the low-boiling pyrolysis oil which is fed thereto and form the spray cone 108 which fills the cross section of the heat exchange channel 126 with fine drops in the form of a mist. The pyrolysis reactor 10 is operated as described above, and the hot pyrolysis gas is laterally introduced through the hot gas line 120 into the spray cone 108, so that intimate mixing of low-boiling pyrolysis oil and hot pyrolysis gas takes place. In this case the hot pyrolysis gas is cooled with at least partial vaporization of the low-boiling pyrolysis oil. High-boiling pyrolysis oil is formed and flows downward together with the cooled pyrolysis gas to the separator vessel 28. The liquid constituents are separated from the gaseous constituents in the separator vessel 28, as described above. At the same time, the atomizer disc 100 of the rotary atomizer 98 is set into rotation by the motor 104 and low-boiling pyrolysis oil is passed through the pipe 106 to the top of the atomizer disc 100. Due to the rotation, the low-boiling pyrolysis oil is finely atomized by centrifugal force and forms a horizontally aligned, thin oil mist 118 in the upper region 156 above the distributor head 96, which is shown in FIG. 3 by a horizontal broken line. The oil mist 118 prevents hot pyrolysis gas from penetrating the upper end region 156, being cooled there and forming tar precipitates or other deposits on the cover 154.

At the same time, high-boiling pyrolysis oil is delivered from the oil space 30 of the cooling stage 22 through the pipe 188 into the bottom of the annular channel 110 by means of the pump 190, so that it rises upward, overflows and forms an uninterrupted layer 114 which wets the entire inner wall of the partition 110 adjoining the heat exchange channel 126. The oil of this layer 114 then runs onto the wall of the heat exchange channel 126 and from there it runs downward over the wall of the channel 160 and collects in the oil space 30. The same also applies to the heat exchange channel according to FIG. 2.

In order to produce a uniform overflow of the oil from the annular channel 110 to the inner wall, the upper edge of the partition 112 of the annular channel 110 is advantageously provided with vertical, sawtooth-like projections 123, as is shown in detail in the section of FIG. 4. Alternatively, the annular channel 110 may be supplied with low-boiling pyrolysis oil from the light oil space 46. For this purpose, the pipe 188 is then to be connected to the light oil space 46.

In the second embodiment of the invention, direct cooling of the hot pyrolysis gas is again achieved in the cooling stage 122 in a simple manner and, at the same time, a deposition of tar constituents, soot or coke from the hot pyrolysis gas on the inner walls of the heat exchange channel 126 is avoided. Furthermore, good cooling of the walls of the heat exchange channel is achieved, so that these walls are made of inexpensive material which only require a low heat resistance.

We claim:

1. Apparatus for the pyrolysis of waste material containing hydrocarbons, comprising a pyrolysis reactor having outlet means for a hot pyrolysis gas, and cooling means immediately downstream of said pyrolysis reactor for cooling the hot pyrolysis gas produced in said pyrolysis reactor, said cooling means having a cooler with a downward-extending heat exchange channel for direct heat exchange between pyrolysis gas and pyrolysis oil produced by condensation of pyrolysis gas, said heat exchange channel having a wall with an inner surface, an upper end region and a lower end, a plurality of pyrolysis oil spray nozzles disposed in a ring in said upper end region of said heat exchange channel having a spray direction aligned substantially toward said lower end of said heat exchange channel, a hot gas line connected to the outlet means of said pyrolysis reactor and leading into said upper end region of said heat exchange channel above said spray nozzles for introducing a hot pyrolysis gas, at least one feed line leading into said upper end region above said spray nozzles for introducing a protective gas, at least one overflow channel connected to said heat exchange channel below said spray nozzles for applying a layer of pyrolysis oil to said inner surface of said wall of said heat exchange channel, and cooled gas outlet means for withdrawing cooled pyrolysis gas from said lower end of said heat exchange channel.

2. Apparatus according to claim 1, wherein said cooler is a first cooler and said cooling means includes a second cooler connected to the cooled gas outlet means of said first cooler.

3. Apparatus according to claim 1, wherein said cooled gas outlet means comprises, a separator vessel connected to said lower end of said heat exchange channel for separating the cooled pyrolysis gas from a high-boiling pyrolysis oil condensed therefrom in said cooler, said separator vessel including an oil collection chamber connected to said overflow channel with a pump therebetween.

4. Apparatus according to claim 2, wherein said second cooler includes means for separating condensed low-boiling pyrolysis oil, from the cooled pyrolysis gas and supplying said spray nozzles with the low-boiling pyrolysis oil.

5. Apparatus according to claim 1, wherein said upper end region includes a hemispherical cover joined to the wall of said heat exchange channel.

6. Apparatus according to claim 1, wherein said heat exchange channel has a vertical axis defined by said wall, and including a toroidal distributor pipe on which said spray nozzles are disposed, said toroidal distributor pipe having a central axis coinciding with said vertical axis of said heat exchange channel.

7. Apparatus according to claim 5, wherein said overflow channel is located adjacent the joint between said cover and the wall of said heat exchange channel.

8. Apparatus according to claim 1, wherein each of said spray nozzles have a spray angle of substantially 45° to 65°

9. Apparatus according to claim 1, wherein said overflow channel surrounds said wall of said heat exchange channel has a multiplicity of passage orifices formed therethrough adjacent the surrounding overflow channel.

* * * * *